(12) United States Patent
Blake, III et al.

(10) Patent No.: US 12,348,847 B2
(45) Date of Patent: Jul. 1, 2025

(54) IMAGE SENSOR ASSEMBLY WITH A FASTENER RECEIVED BY A LENS HOUSING

(71) Applicant: ZF Friedrichshafen AG, Friedrichshafen (DE)

(72) Inventors: Thomas E. Blake, III, Novi, MI (US); Michael A. Hart, Dexter, MI (US); Matthew Warmuth, Northville, MI (US)

(73) Assignee: ZF Friedrichshafen AG, Friedrichshafen (DE)

( * ) Notice: Subject to any disclaimer, the term of this patent is extended or adjusted under 35 U.S.C. 154(b) by 147 days.

(21) Appl. No.: 18/300,050

(22) Filed: Apr. 13, 2023

(65) Prior Publication Data

US 2024/0348904 A1 Oct. 17, 2024

(51) Int. Cl.
*H04N 23/55* (2023.01)
*H04N 23/51* (2023.01)

(52) U.S. Cl.
CPC ............. *H04N 23/55* (2023.01); *H04N 23/51* (2023.01)

(58) Field of Classification Search
CPC ......... H04N 23/55; H04N 23/51; G06B 7/022
See application file for complete search history.

(56) References Cited

U.S. PATENT DOCUMENTS

2024/0019768 A1* 1/2024 Ding .................... G02B 7/02

* cited by examiner

*Primary Examiner* — Nicholas G Giles
(74) *Attorney, Agent, or Firm* — Kristin L. Murphy

(57) ABSTRACT

An image sensor system can include a housing assembly that defines a lens receiving aperture, the lens receiving aperture having an inner diameter. The image sensor system includes a lens assembly that includes a lens housing portion and a fastener configured to be received by the lens housing portion to secure the lens housing portion to the housing assembly. The inner diameter is sized such that the lens receiving aperture mates with the lens housing portion.

18 Claims, 5 Drawing Sheets

IMAGE SENSOR ASSEMBLY WITH A FASTENER RECEIVED BY A LENS HOUSING

TECHNICAL FIELD

The present disclosure relates to electronics and, more specifically, relates to an image sensor assembly including a lens assembly housing configured to reduce axis alignment issues.

BACKGROUND

In some known camera assembly arrangements, tolerances related to roll, yaw, and pitch can deteriorate when mounting a lens assembly to a housing. For example, one of the roll, yaw, and/or pitch may deteriorate due to rotational forces exerted on the lens assembly when fasteners that attach the lens assembly to the housing experience torque.

SUMMARY

An image sensor system can include a housing assembly that defines a lens receiving aperture, the lens receiving aperture having an inner diameter. The image sensor system includes a lens assembly that includes a lens housing portion and a fastener configured to be received by the lens housing portion to secure the lens housing portion to the housing assembly. The inner diameter is sized such that the lens receiving aperture mates with the lens housing portion.

In another exemplary arrangement, the lens housing portion comprises an outer diameter, wherein the outer diameter is smaller than the inner diameter.

In another exemplary arrangement, the lens housing portion includes external threads that are configured to interface with the fastener.

In another exemplary arrangement, the housing assembly defines an inner face disposed about the lens receiving aperture.

In another exemplary arrangement, the lens housing portion comprises a face that interfaces with the face of the housing assembly.

In another exemplary arrangement, the lens assembly includes a lens mount portion, the lens mount portion including at least one flange, the at least one flange defining an aperture configured to be received by a pin of a tool.

In another exemplary arrangement, the lens housing portion and the lens mount portion are integral with one another.

In another exemplary arrangement, the lens mount portion is attached to a circuit board assembly.

In another exemplary arrangement, the fastener comprises a nut.

An image sensor system includes a housing assembly that defines a lens receiving aperture, the lens receiving aperture having an inner diameter. The image sensor system also includes a lens assembly that includes a lens housing portion, the lens housing portion defining external threads. The image sensor system also includes a fastener configured to be received by the lens housing portion via the external threads, wherein the fastener is configured to secure the lens housing portion to the housing assembly. The inner diameter is sized such that the lens receiving aperture mates with the lens housing portion.

In another exemplary arrangement, the lens housing portion comprises an outer diameter, wherein the outer diameter is smaller than the inner diameter.

In another exemplary arrangement, the lens housing portion includes external threads that are configured to interface with the fastener.

In another exemplary arrangement, the housing assembly defines an inner face disposed about the lens receiving aperture.

In another exemplary arrangement, the lens housing portion comprises a face that interfaces with the face of the housing assembly.

In another exemplary arrangement, the lens assembly includes a lens mount portion, the lens mount portion including at least one flange, the at least one flange defining an aperture configured to be received by a pin of a tool.

In another exemplary arrangement, the lens housing portion and the lens mount portion are integral with one another.

In another exemplary arrangement, the lens mount portion is attached to a circuit board assembly.

In another exemplary arrangement, the fastener comprises a nut.

An image sensor system includes a housing assembly that defines a lens receiving aperture, the lens receiving aperture having an inner diameter. The image sensor system also includes a lens assembly that includes a lens housing portion. The lens housing portion can comprise a lens barrel defining external threads about a portion of the lens barrel. The image sensor system also includes a fastener configured to be received by the lens housing portion via the external threads, wherein the fastener is configured to secure the lens housing portion to the housing assembly. The inner diameter is sized such that the lens receiving aperture mates with the lens housing portion.

In another exemplary arrangement, the lens housing portion comprises an outer diameter, wherein the outer diameter is smaller than the inner diameter.

In another exemplary arrangement, the housing assembly defines an inner face disposed about the lens receiving aperture.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
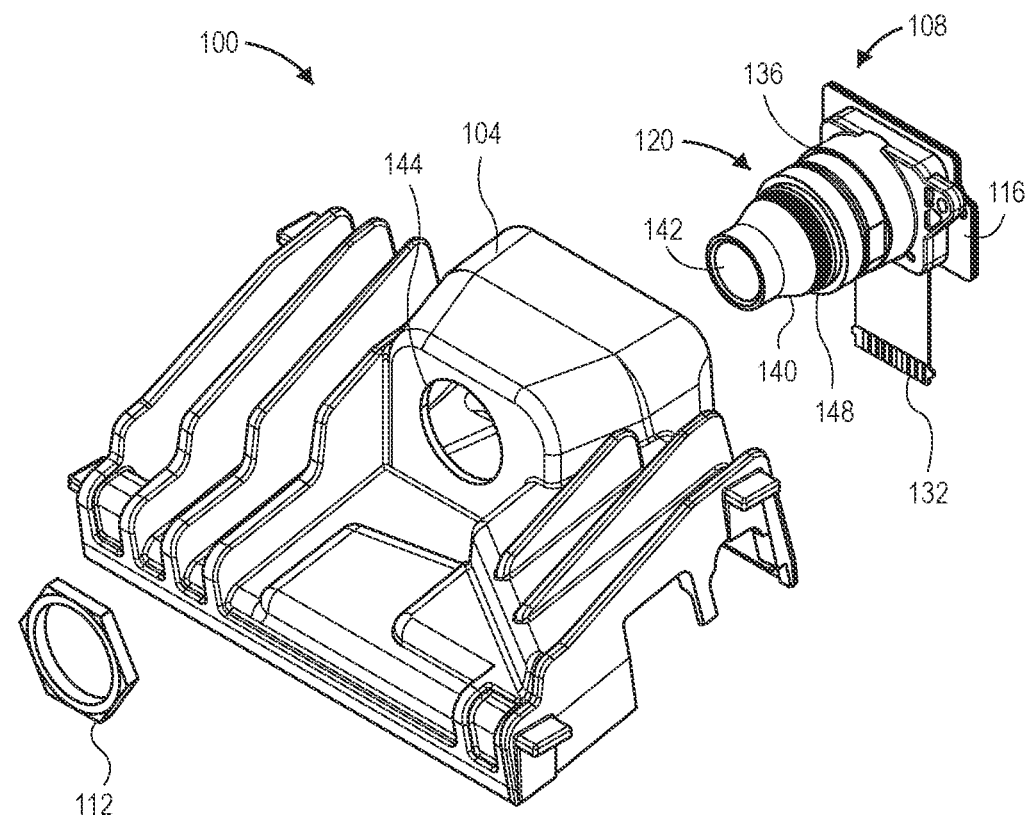
FIG. 1 is a partially exploded isometric view of an image sensor system according to an exemplary arrangement of the present disclosure.

The following description is merely exemplary in nature and is not intended to limit the present disclosure, application, or uses.

In order to mitigate deterioration of roll, yaw, and/or pitch due to rotational forces, an image sensor system can include a lens assembly that includes a lens housing portion and a fastener to be received by the lens housing portion to secure the lens housing portion to a housing assembly. The inner diameter is sized such that the lens receiving aperture mates with the lens housing portion. As discussed herein, an inner diameter of a lens receiving aperture and an outer diameter of the lens housing portion are sized such that the lens receiving aperture mates with the lens housing portion to control centration and alignment of the lens. Additionally, an inner face of the housing assembly can mate with a face of the lens housing portion to minimize detrimental effects associated with a pitch and/or a yaw of an image sensor assembly.

FIGS. 1 through 6 illustrate an image sensor system 100 according to an exemplary arrangement. The image sensor system 100 includes a housing assembly 104, an image sensor assembly 108, and a fastener 112.

The image sensor assembly 108 includes a printed circuit board assembly (PCBA) 116 and a lens assembly 120. The image sensor assembly 108 can include an image sensor (not shown) that is attached, e.g., mounted, to a surface of the printed circuit board assembly 116.

As shown, the printed circuit board assembly 116 can include an electrical connector 132. The electrical connector 132 facilitates the transfer of electrical signals to and/or from the image sensor. In an exemplary arrangement, the electrical connector 132 can comprise a surface-mounted board-to-board (BTB) connector. In another exemplary arrangement, the electrical connector 132 comprises a zero-insertion force (ZIF) interface.

The lens assembly 120 can include a lens mount portion 136 and a lens housing portion 140. In an exemplary arrangement, at least a portion of the lens housing portion 140 comprise a lens barrel. The lens mount portion 120 can be attached to the circuit board assembly 116. For example, the lens mount portion 120 can be attached to the circuit board assembly 116 via an adhesive, fasteners, and the like.

The lens housing portion 140 can retain a lens 142. The lens 142 comprises an optical device that modifies light for the image sensor. For example, the lens 142 can focus light for the image sensor. As described in greater detail herein, the lens mount portion 136 facilitates mounting of the image sensor assembly 108 to the housing assembly 104.

The lens housing portion 140 can also define threads 148 that mate with corresponding threads of the fastener 112. In one exemplary arrangement, the threads 148 of the lens housing portion 140 are external threads and the threads of the fastener 112 are internal threads. In an exemplary arrangement, the fastener 112 comprises a nut. As described herein, the lens housing portion 140, may be received within the housing assembly 104, and the fastener 112 can be used to secure the lens housing portion 140 to the housing assembly 104. For example, the threads 148 of the lens housing portion 140 mate with the threads of the fastener 112 such that the fastener 112 secures the lens mounting portion 148 relative to the housing assembly 104.

Figure 2:
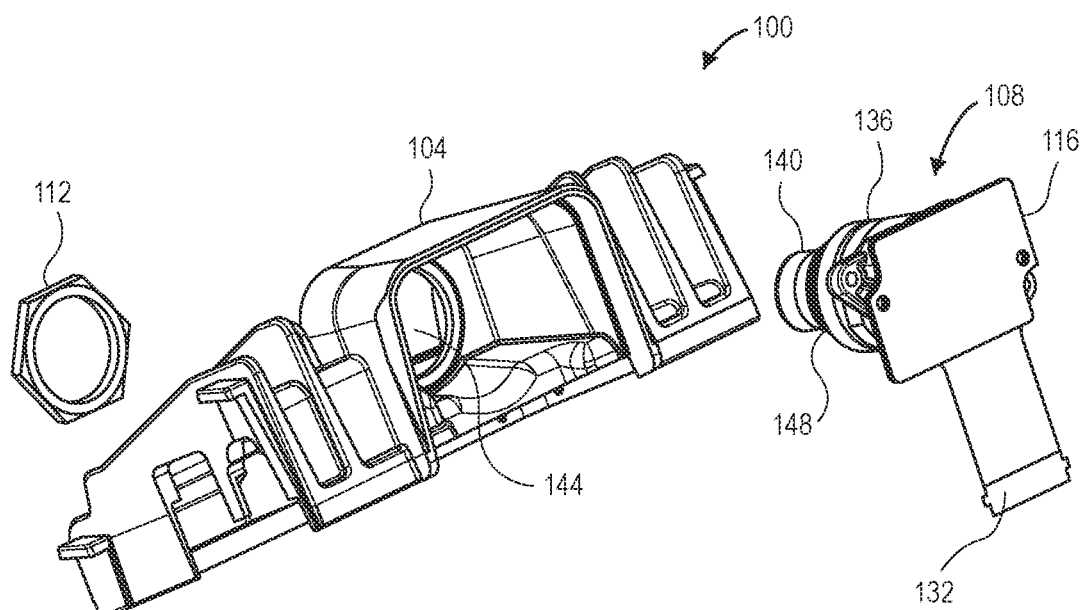
FIG. 2 is another partially exploded isometric view of the image sensor system according to an exemplary arrangement of the present disclosure.

As shown generally in FIGS. 1 and 2, the housing assembly 104 defines a lens receiving aperture 144 that receives a portion of the lens housing portion 140. For example, the housing assembly 104 may define a circular lens receiving aperture 144 that receives a portion of the lens barrel of the lens housing portion 140.

As described in greater detail herein, an inner diameter of the lens receiving aperture 144 and an outer diameter of the lens housing portion 140 is sized such that the lens receiving aperture 144 mates with the lens housing portion 140 to control centration and alignment of the lens 142.

Figure 3:
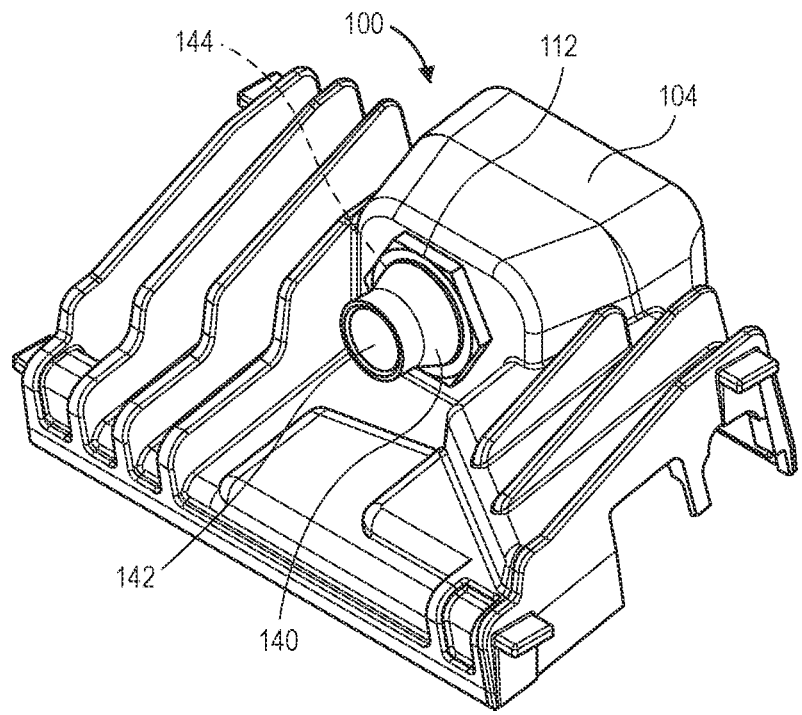
FIG. 3 is an assembled isometric view of the image sensor system according to an exemplary arrangement of the present disclosure.
Figure 4:
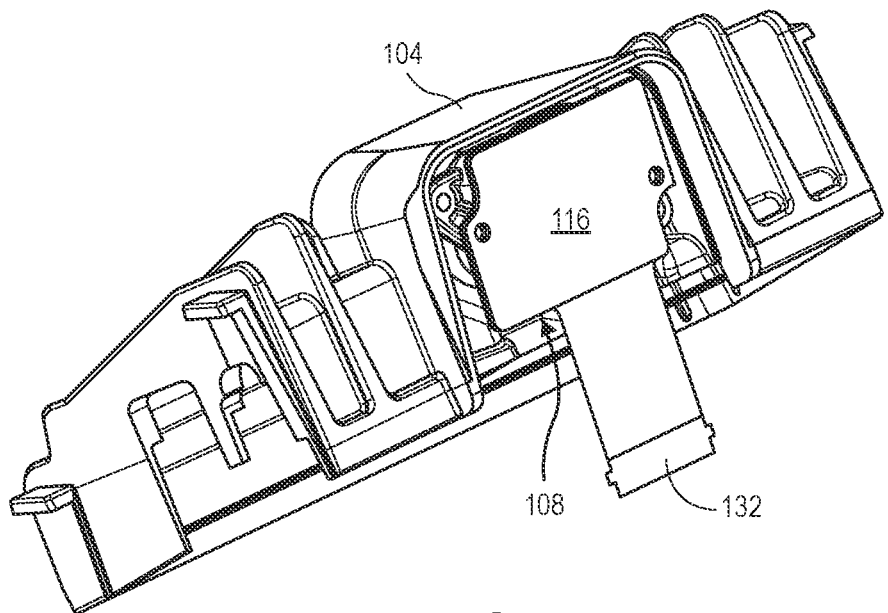
FIG. 4 is an assembled isometric view of the image sensor system according to an exemplary arrangement of the present disclosure.

FIGS. 3 and 4 illustrate the image sensor assembly 108 received by the housing assembly 104. In an exemplary arrangement, the lens housing portion 140 of the image sensor assembly 108 is received by the lens receiving aperture 144 such that the lens housing portion 140 mates with the lens receiving aperture 144. As shown, the fastener 112 is threadably engaged to threads 148 to secure lens housing portion 140 to the housing assembly 104.

Figure 5:
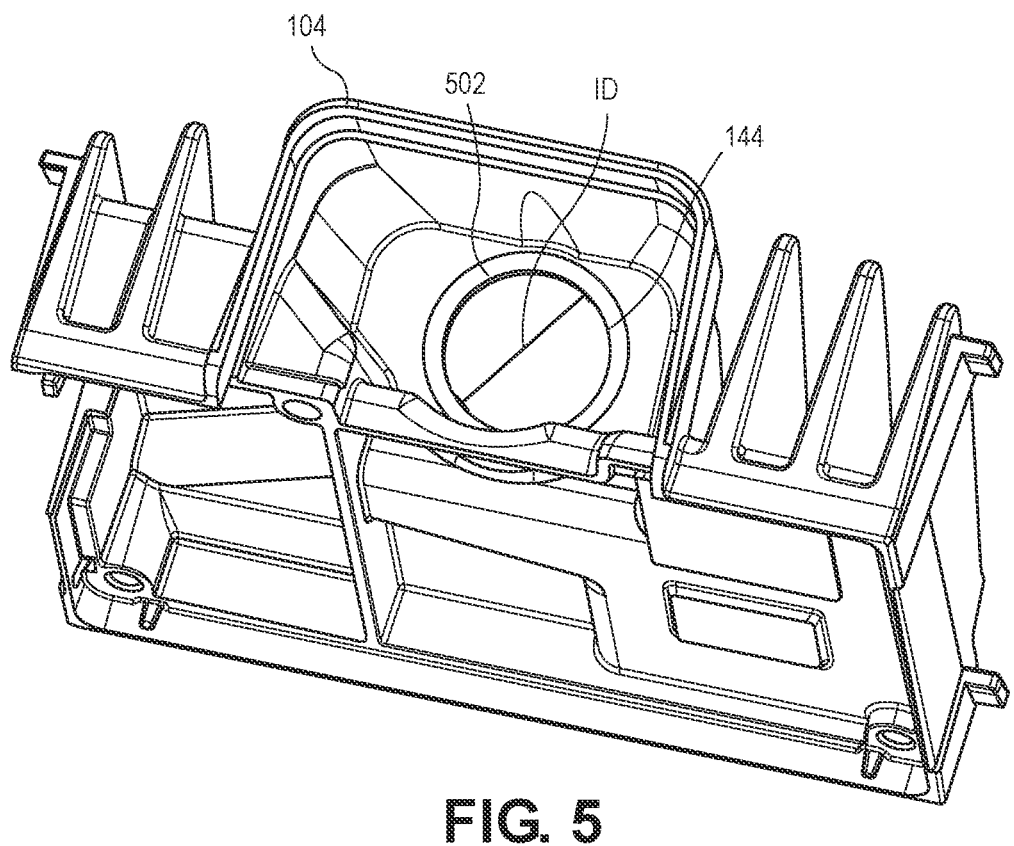
FIG. 5 is an isometric view of the housing assembly of the image sensor system according to an exemplary arrangement of the present disclosure.

As shown in FIG. 5, the lens receiving aperture 144 defines an inner diameter ID that is sized such that the lens receiving aperture 144 mates with the lens housing portion 140. In one exemplary arrangement, the housing assembly 104 defines an inner face 502 around the lens receiving aperture 144. The inner face 502 can mate with a face of the lens housing portion 140 (see FIGS. 7 through 9) to minimize detrimental effects associated with a pitch and/or a yaw of the image sensor assembly 108.

Figure 6:
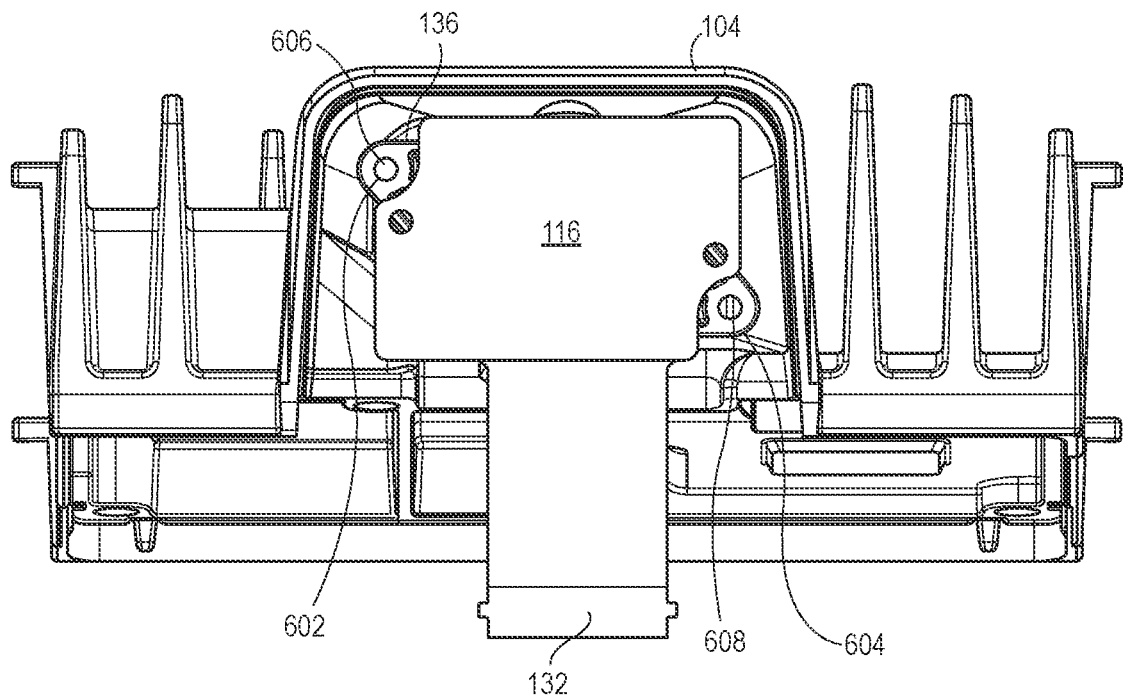
FIG. 6 is an assembled backside view of the image sensor system according to an exemplary arrangement of the present disclosure.

Referring to FIG. 6, the lens mount portion 136 can include flanges 602, 604 that define respective apertures 606, 608. The apertures 606, 608 align with corresponding pins (not shown). The pins may be associated with a tool that can rotate the image sensor assembly 108 to minimize roll error associated with the image sensor of the image sensor assembly 108. The pins may also counteract any rotational forces exerted on the image sensor assembly 108 caused by torquing of the fastener 112.

Figure 7:
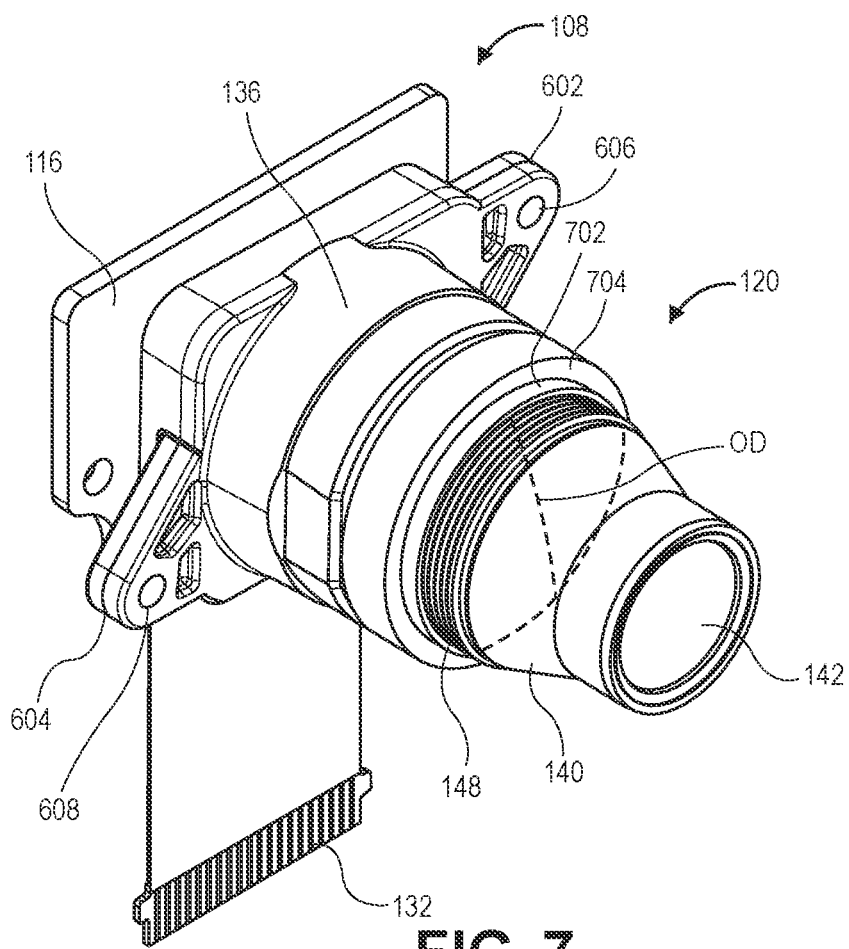
FIG. 7 is an isometric view of an image sensor assembly of the image sensor system according to an exemplary arrangement of the present disclosure.

As shown in FIG. 7, the lens assembly 120 comprises the lens mount portion 136 and the lens housing portion 140. The lens housing portion 140 can define an outer diameter (OD) that allows the lens housing portion 140 to mate with the inner diameter of the lens receiving aperture 144 as discussed above. Within this exemplary arrangement, the outer diameter is smaller than the inner diameter. The outer diameter can be defined with respect to a surface 702 immediately adjacent to and between a face 704 and the threads 148 of the lens housing portion 140. When received by the housing assembly 104, the face 704 of the lens housing portion 140 interfaces with the face 502 of the housing assembly 104. As described above, the outer diameter can control centration and alignment of the lens 142 by way of the surface 702 interfacing with an inner surface of the lens receiving aperture 144.

Figure 8:
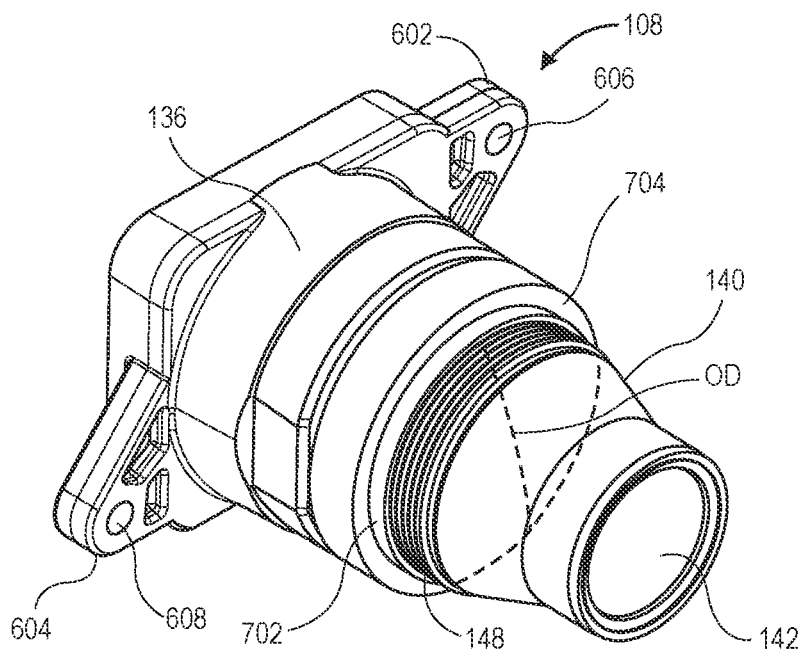
FIG. 8 is an isometric view of a lens assembly of the image sensor system according to an exemplary arrangement of the present disclosure.
Figure 9:
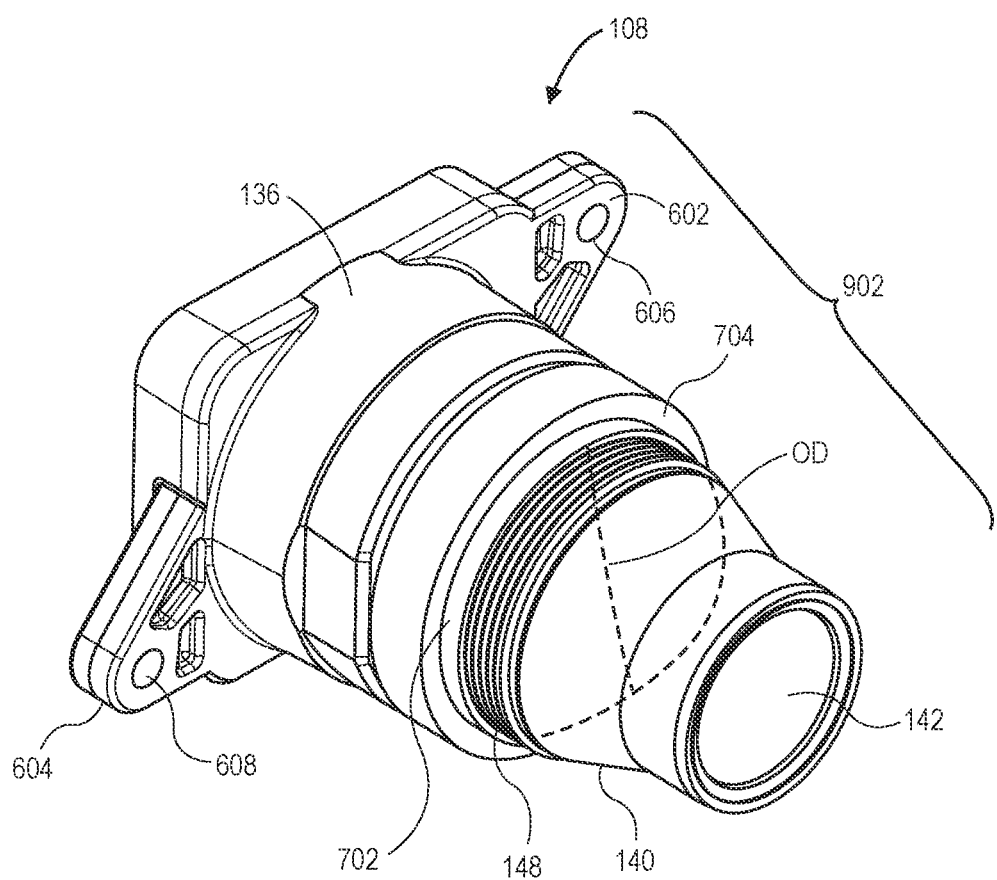
FIG. 9 is an isometric view of a lens assembly of the image sensor system according to another exemplary arrangement of the present disclosure.

FIGS. 8 and 9 illustrate various exemplary arrangements of the lens assembly 120. As shown in FIG. 8, the lens mount portion 136 and the lens housing portion 140 of the lens assembly 120 may comprise distinct portions, i.e., pieces. For instance, the lens mount portion 136 and the lens housing portion 140 may be manufactured separately and attached together after manufacturing is complete. Referring to FIG. 9, the lens mount portion 136 and the lens housing portion 140 comprise a unibody portion 902. In this exemplary arrangement, the lens housing portion 140 is integrated with the lens mount portion 136.

Accordingly, it is to be understood that the above description is intended to be illustrative and not restrictive. Many implementations and applications other than the examples provided would be apparent to those of skill in the art upon reading the above description. The scope of the disclosure should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future implementations. In sum, it should be understood that the disclosure is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An image sensor system, comprising:
   a housing assembly that defines a lens receiving aperture, the lens receiving aperture having an inner diameter and an inner face surrounding the lens receiving aperture on an inside surface of the housing assembly;
   a lens assembly that includes a lens housing portion having a face formed on the lens housing portion; and
   a fastener configured to be received by the lens housing portion to secure the lens housing portion to the housing assembly,
   wherein the inner face surrounding the lens receiving aperture is sized to correspond with the face formed on the lens housing portion, and wherein the inner face mates with the face formed on the lens housing portion, with a portion of the lens housing portion extending outwardly from the lens receiving aperture of the housing assembly.

2. The image sensor system as recited in claim 1, wherein the lens housing portion comprises an outer diameter, wherein the outer diameter is smaller than the inner diameter.

3. The image sensor system as recited in claim 1, wherein the lens housing portion includes threads that are configured to interface with the fastener.

4. The image sensor system as recited in claim 1, wherein the lens assembly includes a lens mount portion, the lens mount portion including at least one flange, the at least one flange defining an aperture configured to be received by a pin of a tool.

5. The image sensor system as recited in claim 4, wherein the lens housing portion and the lens mount portion are integral with one another.

6. The image sensor system as recited in claim 4, wherein the lens mount portion is attached to a circuit board assembly.

7. The image sensor system as recited in claim 1, wherein the fastener comprises a nut.

8. An image sensor system, comprising:
   a housing assembly that defines a lens assembly cavity, the lens assembly cavity defining a lens receiving aperture and an open reward end, the lens receiving aperture having an inner diameter, wherein the lens receiving aperture is spaced inwardly from a forward edge of the housing assembly;
   a lens assembly that includes a lens housing portion, the lens housing portion defining threads; and
   a fastener configured to be received by the lens housing portion via the threads, wherein the fastener is configured to secure the lens housing portion to the housing assembly so as to be spaced inwardly from a forward edge of the housing assembly,
   wherein the inner diameter is sized such that the lens receiving aperture mates with the lens housing portion.

9. The image sensor system as recited in claim 8, wherein the lens housing portion comprises an outer diameter, wherein the outer diameter is smaller than the inner diameter.

10. The image sensor system as recited in claim 8, wherein the housing assembly defines an inner face disposed about the lens receiving aperture on an inside surface of the lens assembly cavity.

11. The image sensor system as recited in claim 10, wherein the lens housing portion comprises a face that interfaces with the face of the housing assembly.

12. The image sensor system as recited in claim 8, wherein the lens assembly includes a lens mount portion, the lens mount portion including at least one flange, the at least one flange defining an aperture configured to be received by a pin of a tool.

13. The image sensor system as recited in claim 12, wherein the lens housing portion and the lens mount portion are integral with one another.

14. The image sensor system as recited in claim 12, wherein the lens mount portion is attached to a circuit board assembly.

15. The image sensor system as recited in claim 8, wherein the fastener comprises a nut.

16. An image sensor system, comprising:
   a housing assembly that defines a lens receiving aperture, the lens receiving aperture having an inner diameter;
   a lens assembly that includes a lens housing portion and a lens mount portion, wherein the lens housing portion comprising a lens barrel defining threads about a portion of the lens barrel, wherein the lens mount portion having mounting flanges;
   a printed circuit portion to which the lens assembly mount portion is attached, wherein the printed circuit board is contoured to provide access to the mounting flanges; and
   a fastener configured to be received by the lens housing portion via the threads, wherein the fastener is configured to secure the lens housing portion to the housing assembly,
   wherein the inner diameter is sized such that the lens receiving aperture mates with the lens housing portion.

17. The image sensor system as recited in claim 16, wherein the lens housing portion comprises an outer diameter, wherein the outer diameter is smaller than the inner diameter.

18. The image sensor system as recited in claim 16, wherein the housing assembly defines an inner face disposed about the lens receiving aperture.

* * * * *